United States Patent
Henry et al.

(10) Patent No.: US 8,997,461 B2
(45) Date of Patent: Apr. 7, 2015

(54) AFTERTREATMENT SYSTEM HAVING TWO SCR CATALYSTS

(71) Applicant: Cummins Emission Solutions, Inc., Columbus, IN (US)

(72) Inventors: Cary Henry, Columbus, IN (US); Michael Ruth, Franklin, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 122 days.

(21) Appl. No.: 13/626,145

(22) Filed: Sep. 25, 2012

(65) Prior Publication Data

US 2013/0305695 A1 Nov. 21, 2013

Related U.S. Application Data

(60) Provisional application No. 61/649,880, filed on May 21, 2012.

(51) Int. Cl.
*F01N 3/00* (2006.01)
*F01N 3/035* (2006.01)
*F01N 3/10* (2006.01)
(Continued)

(52) U.S. Cl.
CPC ............. *F01N 3/208* (2013.01); *F01N 3/035* (2013.01); *F01N 3/103* (2013.01); *F01N 11/00* (2013.01); *F01N 13/0093* (2013.01); *F01N 2550/05* (2013.01); *F01N 2610/146* (2013.01); *F01N 2900/1602* (2013.01); *F01N 2900/1621* (2013.01); *F01N 2900/1626* (2013.01); *F01N 2900/1821* (2013.01); *Y02T 10/24* (2013.01); *Y02T 10/47* (2013.01)

(58) Field of Classification Search
CPC ........... F01N 3/10; F01N 3/18; F01N 3/2066; F01N 3/208; F01N 2240/00
USPC ........... 60/272, 273, 278, 282, 286, 287, 295, 60/297, 301, 303
See application file for complete search history.

(56) References Cited

U.S. PATENT DOCUMENTS

| | | | |
|---|---|---|---|
| 6,125,629 | A | 10/2000 | Patchett |
| 6,182,444 | B1 | 2/2001 | Fulton et al. |

(Continued)

FOREIGN PATENT DOCUMENTS

| | | |
|---|---|---|
| EP | 2 230 001 A1 | 9/2010 |
| EP | 1 458 960 B1 | 2/2011 |

OTHER PUBLICATIONS

International Search Report and Written Opinion of the International Searching Authority, International PCT Application No. PCT/US2013/041959, Oct. 1, 2013, 11 pages.

*Primary Examiner* — Thomas Denion
*Assistant Examiner* — Mickey France
(74) *Attorney, Agent, or Firm* — Krieg DeVault LLP

(57) ABSTRACT

A system and method includes an internal combustion engine capable of producing an exhaust stream and an aftertreatment system operationally coupled to the exhaust stream. The aftertreatment system includes an upstream selective reduction catalyst (SCR) component and a downstream SCR component that are positioned in substantially different thermal environments. The upstream and downstream SCR components are sized to fully treat the entire exhaust stream at a low temperature highest NOx conversion condition, and the downstream SCR component is sized to fully treat the entire exhaust stream at a high temperature highest NOx conversion condition.

33 Claims, 2 Drawing Sheets

(51) Int. Cl.
*F01N 3/20* (2006.01)
*F01N 11/00* (2006.01)
*F01N 13/00* (2010.01)

(56) References Cited

U.S. PATENT DOCUMENTS

| | | | |
|---|---|---|---|
| 6,761,025 B1 * | 7/2004 | Gladden | 60/286 |
| 6,996,975 B2 | 2/2006 | Radhamohan et al. | |
| 7,229,597 B2 | 6/2007 | Patchett et al. | |
| 7,264,785 B2 | 9/2007 | Blakeman et al. | |
| 7,485,272 B2 | 2/2009 | Driscoll et al. | |
| 7,799,289 B2 * | 9/2010 | Robel | 422/180 |
| 7,805,929 B2 | 10/2010 | Driscoll | |
| 7,902,107 B2 | 3/2011 | Patchett et al. | |
| 7,998,423 B2 | 8/2011 | Boorse et al. | |
| 8,293,197 B2 * | 10/2012 | Winkler et al. | 423/213.2 |
| 8,381,514 B2 * | 2/2013 | Salanta et al. | 60/286 |
| 8,409,515 B2 * | 4/2013 | Ren et al. | 422/171 |
| 8,448,424 B2 * | 5/2013 | Huang et al. | 60/286 |
| 8,486,341 B2 * | 7/2013 | Driscoll et al. | 422/177 |
| 8,601,796 B2 * | 12/2013 | Hinz et al. | 60/295 |
| 2004/0118109 A1 * | 6/2004 | Gladden | 60/286 |
| 2004/0237507 A1 * | 12/2004 | Duvinage et al. | 60/276 |
| 2005/0069476 A1 | 3/2005 | Blakeman et al. | |
| 2005/0284134 A1 | 12/2005 | Radhamohan et al. | |
| 2007/0051096 A1 * | 3/2007 | Pfeifer et al. | 60/286 |
| 2007/0122317 A1 * | 5/2007 | Driscoll et al. | 422/170 |
| 2008/0060348 A1 * | 3/2008 | Robel et al. | 60/295 |
| 2008/0072575 A1 * | 3/2008 | Yan | 60/284 |
| 2009/0031702 A1 * | 2/2009 | Robel | 60/274 |
| 2009/0133383 A1 * | 5/2009 | Shost | 60/276 |
| 2009/0193794 A1 * | 8/2009 | Robel et al. | 60/295 |
| 2009/0222191 A1 * | 9/2009 | Andrasko | 701/102 |
| 2009/0293459 A1 * | 12/2009 | Shimomura et al. | 60/286 |
| 2010/0005783 A1 * | 1/2010 | Keppeler et al. | 60/277 |
| 2010/0180579 A1 | 7/2010 | Huang et al. | |
| 2010/0180580 A1 | 7/2010 | Boorse et al. | |
| 2010/0250090 A1 | 9/2010 | Jasinkiewicz et al. | |
| 2010/0319324 A1 * | 12/2010 | Mital | 60/286 |
| 2011/0023463 A1 | 2/2011 | Dobson et al. | |
| 2011/0138776 A1 | 6/2011 | Huang et al. | |
| 2011/0146252 A1 | 6/2011 | Silver et al. | |
| 2011/0162347 A1 * | 7/2011 | Katare et al. | 60/274 |
| 2011/0265452 A1 | 11/2011 | Geveci et al. | |
| 2011/0283680 A1 * | 11/2011 | Gekas et al. | 60/274 |
| 2012/0023905 A1 * | 2/2012 | Yezerets et al. | 60/274 |
| 2012/0324868 A1 * | 12/2012 | Kim et al. | 60/274 |
| 2013/0232958 A1 * | 9/2013 | Ancimer et al. | 60/301 |

* cited by examiner

AFTERTREATMENT SYSTEM HAVING TWO SCR CATALYSTS

CROSS-REFERENCE TO RELATED APPLICATION

The present application claims the benefit of the filing date of Provisional Application No. 61/649,880 filed on May 21, 2012, which is incorporated herein by reference.

BACKGROUND

Modern emissions regulations have led to many internal combustion engine applications utilizing SCR systems to reduce $NO_x$ down to regulatory levels. SCR catalyst formulations have a preferred temperature operating range where $NO_x$ conversion is at highest efficiency. In addition to high efficiency being desirable, higher efficiencies may be required to meet emissions targets depending upon the system design. At very high temperatures, parasitic oxidation reactions of the reductant reagent reduce the total conversion achievable by the SCR system, and increase the operating cost of the system through ineffective losses of the reducing agent. In the period following a cold start operation, it can take a substantial amount of time for the SCR catalyst to reach an effective operating temperature. During operating periods where another aftertreatment component is regenerating, for example a particulate filter, the engine out temperatures can reach very high temperatures that are well into the reductant oxidation temperature regime.

SUMMARY

Various systems, apparatus, and methods are disclosed for treatment of an exhaust stream produced by an internal combustion engine. An upstream selective reduction catalyst (SCR) component and a downstream SCR component that are positioned in substantially different thermal environments in the exhaust system. The upstream and downstream SCR components are sized to be fully utilized for treatment of the entire exhaust stream at a low temperature highest NOx conversion condition, and the downstream SCR component is sized to fully treat the entire exhaust stream at a high temperature highest NOx conversion condition. Reductant delivery devices may be provided upstream of the upstream SCR component and between the upstream and downstream SCR components.

The systems, methods and apparatus also include interpreting a current system operating condition of an internal combustion engine producing an exhaust stream and determining an active SCR component in response to the current system operating condition from one of the upstream and downstream SCR components. In response to determining the active SCR component, one of an upstream reductant delivery device command to the upstream reductant delivery device and a downstream reductant delivery device command to the downstream reductant delivery device is provided for reductant inject.

These and other aspects, forms, features, embodiments, and components are described in further detail below.

DESCRIPTION OF ILLUSTRATIVE EMBODIMENTS

Figure 1:
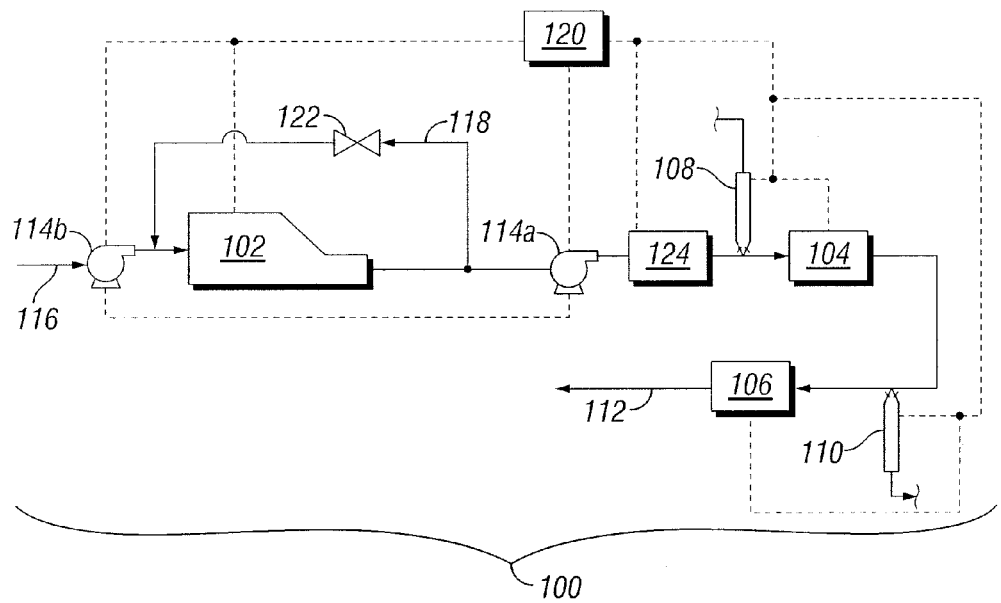
FIG. 1 is a schematic diagram of a system including an aftertreatment system having two SCR catalyst components.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 for treating $NO_x$ emissions for an internal combustion engine is depicted schematically. The system 100 includes an internal combustion engine 102 producing an exhaust stream 112. The internal combustion engine 102 may be of any type, including but not limited to a diesel engine. The system 100 further includes an aftertreatment system operationally coupled to the exhaust stream 112. The aftertreatment system includes an upstream SCR component 104 and a downstream SCR component 106. The SCR components 104, 106 may include the same or distinct catalyst formulations. The SCR components 104, 106 may have catalyst formulations of any type known in the art, including for example a zeolite-Cu formulation and/or a zeolite-Fe formulation. Other formulations are contemplated, including vanadium, base metal catalysts, etc.

In certain embodiments, the upstream SCR component 104 is formulated as a part of a particulate filter. In one example, the upstream SCR component 104 is an SCR catalyst washcoat provided on a diesel particulate filter (DPF). In certain embodiments, the system 100 includes an oxidation catalyst 124 positioned between the engine 102 and the upstream SCR component 104. An example system 100 includes the upstream SCR component 104, and/or the oxidation catalyst 124 (where present) provided as a close-coupled catalyst. Close-coupled, as used herein, should be understood broadly. Close-coupled can include provided as close as practical at a position downstream of a turbine 114a portion of a turbocharger 114a, 114b, provided within a specified distance downstream of the turbine 114a (such as within 12 inches), and/or provided within a specified heat transfer regime (such as away from an area experiencing significant ambient flow during system 100 operations such as vehicle travel).

The system 100 further includes an upstream reductant delivery device 108 positioned upstream of the upstream SCR component 104, and a downstream reductant delivery device 110 positioned upstream of the downstream SCR component 106. The reductant delivery devices 108, 110 include any type of reductant injector or delivery device known in the art, including a urea or ammonia injector, and further including an air-assisted, liquid phase, or gas phase injector.

The example system 100 further includes an EGR loop 118 having an EGR valve 122. An air intake 116 into the system 100 is fluidly coupled to a compressor side 114b of the turbocharger 114a, 114b. The illustrative system 100 includes certain features and components that may not be present in certain embodiments, and in certain embodiments other features or components not shown will be present. The system 100 includes various sensors and actuators that are not shown for purposes of clarity. Sensors may include, without limitation, various temperature sensors, pressure sensors, composition sensors (e.g. $NH_3$, $NO_x$, $O_2$, etc.) and/or speed sensors.

The system 100 further includes a downstream SCR component 106. The downstream SCR component 106 is in a substantially different thermal environment than the upstream SCR component 104. A thermal environment that is a substantially different thermal environment should be understood broadly. An example substantially different thermal environment is a thermal environment that varies according to a temperature observed over time after an engine start event, for example where the downstream SCR component 106 warms up more slowly, and/or warms up to a different final temperature than the upstream SCR component 104. Another example substantially different thermal environment is an environment having a differential heat transfer environment, either a static heat transfer environment and/or a dynamic heat transfer environment (such as when a vehicle including the system 100 is moving). Another example substantially different thermal environment is an environment where at a first range of engine operating conditions the upstream SCR component 104 is within a desired temperature operating range (e.g. between 200° C. and 400° C.), and at a second range of engine operating conditions the downstream SCR component 106 is within a desired temperature operating range. The first range of engine operating conditions and the second range of engine operating conditions may overlap or be entirely separate; the only requirement is that the first range of engine operating conditions is not coextensive with the second range of engine operating conditions. The desired temperature operating range for each of the SCR components 104, 106 may be the same temperature ranges or differing temperature ranges, and depend upon one or more of various factors understood in the art including but not limited to: catalyst formulations, space-velocity and/or catalyst volume considerations, presently stored amounts of reductant on each SCR component 104, 106, and/or the presently available $NO:NO_2$ ratio at each SCR component 104, 106.

Conditions defining a range of "engine operating conditions" should be understood broadly, and can include engine speed-load information, but may alternatively or additionally include, without limitation, vehicle loading (such as weight, road grade, etc.), ambient temperature, ambient pressure, ambient wind speed and direction, vehicle speed, transient or steady operation, timing and other characteristics of engine fueling (e.g. post- and/or pilot fueling events), the availability and usage of hydrocarbon dosing into the aftertreatment system, turbocharger 114a, 114b operational characteristics (such as wastegate values, VGT position, etc.), EGR 118 operational characteristics, and/or the positions or usage of any cooler bypass devices (such as EGR cooler or intercooler bypasses—not shown). Where there is overlap of the first and second range of engine operating conditions—for example where both SCR components 104, 106 are within the desired operating ranges at a given engine operating condition—the controller 120 may treat NOx emissions with either or both of the SCR components 104, 106 according to any desired operating principles, including without limitations any principles described in the section referencing FIG. 2. Example operating principles include favoring one of the SCR components 104, 106 within the shared engine operating regions (e.g. always utilizing the upstream SCR component 104 within a given shared engine operating region), remaining with a given utilized SCR component 104, 106 until a switch is dictated by entering an engine operating region where only the opposing SCR component 104, 106 is favored and then switching, and/or by applying a hysteresis value to any switching. The hysteresis value may be in any units known in the art, for example a time-based hysteresis, a temperature-based hysteresis, an engine-load based hysteresis, etc.

In certain embodiments, each of the SCR components 104, 106 is sized to fully treat $NO_x$ emissions of the engine 102, at least for the engine operating conditions wherein the corresponding SCR component 104, 106 is dominant or active. In certain embodiments, the upstream SCR component 104 is sized to fully treat the entire exhaust stream at a highest $NO_x$ conversion condition corresponding to normal operating temperatures. In yet another embodiment, the upstream and downstream SCR components 104, 106 are sized where both are fully utilized for $NO_x$ reduction in a first operating condition such as at normal operating temperatures, and the downstream SCR component 106 is sized to fully treat the entire exhaust gas stream in a second operating condition, such as at high operating temperatures. Normal operating temperatures include operating temperatures that are not high operating temperatures, operating temperatures that exist during periods wherein an aftertreatment component is not undergoing a thermally based regeneration, operating temperatures that are not cold or warm-up operating temperatures, and/or operating temperatures that are not fully loaded engine operating temperatures.

A highest $NO_x$ conversion condition corresponds to a condition wherein the greatest amount of $NO_x$ conversion is expected to occur in the aftertreatment system for the system to be emissions compliant and/or to achieve the scheduled emissions target. For example, a highest total $NO_x$ output of the engine may be the highest $NO_x$ conversion condition. Additionally or alternatively, a highest total $NO_x$ output of the engine experienced at any normal operating temperature is a highest $NO_x$ conversion condition. In certain embodiments, an operating condition requiring the highest $NO_x$ conversion percentage, and/or an operating condition requiring the most difficult to achieve $NO_x$ conversion percentage is a highest NOx conversion condition. Example highest $NO_x$ conversion conditions include the highest engine out $NO_x$ condition, the highest required $NO_x$ conversion percentage (e.g. 93% conversion required), and/or the most difficult to achieve $NO_x$ conversion percentage (e.g. 85% conversion required at a space-velocity value rendering the 85% the most difficult $NO_x$ conversion percentage to achieve within the operating conditions providing a normal operating temperature even where higher $NO_x$ conversion percentages may be required at lower space-velocity values). In certain embodiments, the upstream SCR component 104 is sized such that required $NO_x$ conversion can be achieved at any operating condition within design limits that occurs throughout the normal operating temperature region is sized to fully treat the entire exhaust stream at the highest $NO_x$ conversion condition corresponding to normal operating temperatures.

In certain embodiments, the system 100 further includes a controller 120 structured to perform certain operations to control an aftertreatment system for the engine 102. In certain embodiments, the controller 120 forms a portion of a processing subsystem including one or more computing devices having memory, processing, and communication hardware. The controller 120 may be a single device or a distributed device, and the functions of the controller 120 may be performed by hardware or software. The controller 120 is in communication with any devices, sensors, and/or actuators as required to perform the functions present in a given embodiment.

In certain embodiments, the controller 120 includes one or more modules structured to functionally execute the operations of the controller 120. In certain embodiments, the controller 120 includes an operating regime module, an SCR selection module, and an SCR execution module. The description herein including modules emphasizes the structural independence of the aspects of the controller 120, and illustrates one grouping of operations and responsibilities of the controller 120. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
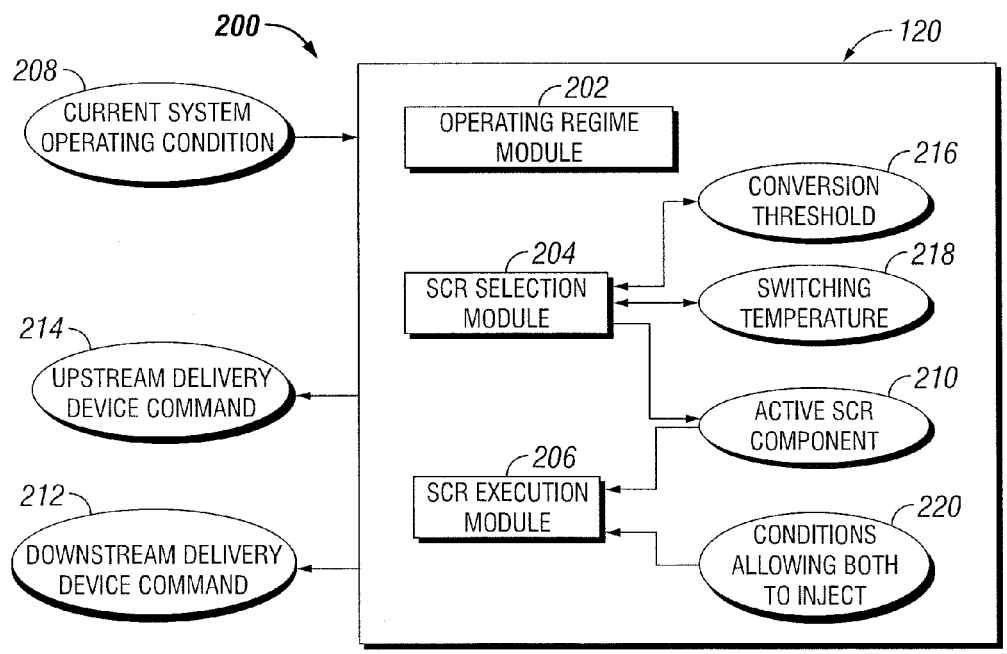
FIG. 2 is a schematic diagram of a processing subsystem having a controller that functionally executes operations to control an aftertreatment system.

FIG. 2 is a schematic illustration of a processing subsystem 200 including a controller 120. The controller 120 includes an operating regime module that interprets a current system operating condition. The current system operating condition includes, without limitation, a temperature of the upstream SCR component, a temperature of the downstream SCR component, a time since an engine start, an accumulated operating parameter since an engine start, a time since a change in the active SCR component, and/or an accumulated operating parameter since a change in the active SCR component, and an engine loading parameter. An accumulated operating parameter since an engine start includes, without limitation, a total fueling accumulated, a total engine power output, a vehicle miles traveled value, and/or a time accumulated above an engine loading or power output threshold. An accumulated operating parameter since a change in the active SCR component includes without limitation, a total fueling accumulated, a total engine power output, a vehicle miles traveled value, a time accumulated above an engine loading or power output threshold, a total amount of reductant injected, and/or a total amount of engine-out $NO_x$ emitted.

The controller 120 further includes an SCR selection module that determines an active SCR component 210 in response to the current system operating condition 208. The active SCR component 210 includes the SCR component 104, 106 which is favored to perform NOx conversion operations for the system 100 under the current system operating conditions 208. An example includes providing the active SCR component 210 as the upstream SCR component 104 after a cold start or at low temperature operations. An additional or alternative example includes providing the active SCR component 210 as the downstream SCR component 106 at high temperature operations and/or during a thermal regeneration of one of the aftertreatment components. An additional or alternative example includes providing the active SCR component 210 as the upstream SCR component 104 at nominal temperature operations, and/or during operations wherein the downstream SCR component 106 is not in a clearly favored temperature region over the upstream SCR component 104. An additional or alternative example includes providing the active SCR component 210 as the same active SCR component 210 from a previous execution cycle of the controller 120 in response to neither or both of the SCR components 104, 106 being favored under the current system operating conditions 208.

The controller 120 further includes an SCR execution module 206 that provides one of an upstream reductant delivery device command 214 and a downstream reductant delivery device command 212 in response to the active SCR component 210. In certain embodiments, the SCR execution module 206 provides both of the reductant delivery device commands 214, 212, and further in certain embodiments one or both of the reductant delivery device commands 214, 212 may be zero. In certain embodiments, the SCR execution module 206 provides the reductant delivery device command 214, 212 that provides the appropriate $NO_x$ reduction on the active SCR component 210. In certain embodiments, the SCR execution module 206 provides the reductant delivery device commands 214, 212 that acceptably progress the system toward providing the appropriate $NO_x$ reduction on the active SCR component 210 (e.g. switching from the upstream SCR component 104 to the downstream SCR component 106 as the active SCR component 210, and ramping down the upstream reductant delivery device 108 while ramping up the downstream reductant delivery device 110). In certain embodiments, the SCR execution module 206 provides the reductant delivery device command 214, 212 that provides the appropriate $NO_x$ reduction on the active SCR component 210, and further provides a reductant delivery device command 214, 212 that provides reducing agent to the SCR component that is not the active SCR component 210, for example to provide $NH_3$ filling of storage locations on the SCR component that is not the active SCR component 210. The provided reductant delivery device commands 212, 214 may further be limited by other considerations understood in the art, including for example $NH_3$ slip limitations, diagnosing operations, adjustments to account for degradation of one or more system components, etc.

In certain embodiments, the SCR selection module 204 further determines the upstream SCR component 104 is the active SCR component 210 in response to an engine cold start operation. Additionally or alternatively the SCR selection module 204 further determines the downstream SCR component 106 is the active SCR component 210 in response to one or more of the operating conditions such as: an aftertreatment component regeneration event or an impending regeneration event, a particulate filter regeneration event or impending regeneration event, and a high engine load or impending high engine load. In certain embodiments, the SCR selection module 206 determines the downstream SCR component 106 is the active SCR component 210 in response to an inlet temperature of the upstream SCR component 104 exceeding a switching temperature 218. An example and non-limiting switching temperature is 400° C. Temperatures between 250° C. to 450° C. may be utilized as the switching temperature 218, where a switching temperature 218 is utilized. In certain embodiments, the SCR selection module 204 further applies a temperature hysteresis to the switching temperature 218, for example a 5° C. hysteresis, 10° C. hysteresis, 25° C. hysteresis, 50° C. hysteresis, or other value.

In certain embodiments, the operating regime module 202 further interprets an upstream reductant oxidation conversion (e.g. as a part of the current system operating condition 208, or separately—not shown). The SCR selection module further determines the downstream SCR component 106 is the active SCR component 210 in response to the upstream reductant oxidation conversion exceeding a conversion threshold 216. The upstream reductant oxidation conversion is a measured or modeled oxidation occurrence of the reducing agent on the upstream SCR component 104. The conversion threshold 216 includes any selected value, with example values including 5%, 10%, 25%, 30%, and 50% oxidation conversion of the reducing agent at the upstream SCR component 104. In certain embodiments, a hysteresis value is applied to the conversion threshold 216 that includes the upstream reductant oxidation conversion value.

In certain embodiments, the conversion threshold 216 is a dynamic value, for example determined according to a $NO_x$ conversion efficiency of the upstream SCR component 104 and/or downstream SCR component 106. In the example, where the downstream SCR component 106 is not yet operating efficiently, the conversion threshold 216 may be raised to a value such that it is still a more efficient use of reducing agent to continue to convert $NO_x$ at the upstream SCR component 104. Further in the example, as the downstream SCR component 106 warms up and enters a more efficient operating region, the conversion threshold 216 may be lowered, and at some point it is determined to be a more efficient use of reducing agent to convert $NO_x$ at the downstream SCR component 106. The conversion threshold 216 may be set, in addition to other considerations, according to a certainty or uncertainty of a reducing agent oxidation model and/or the $NO_x$ reduction models of the SCR components 104, 106.

Figure 3:
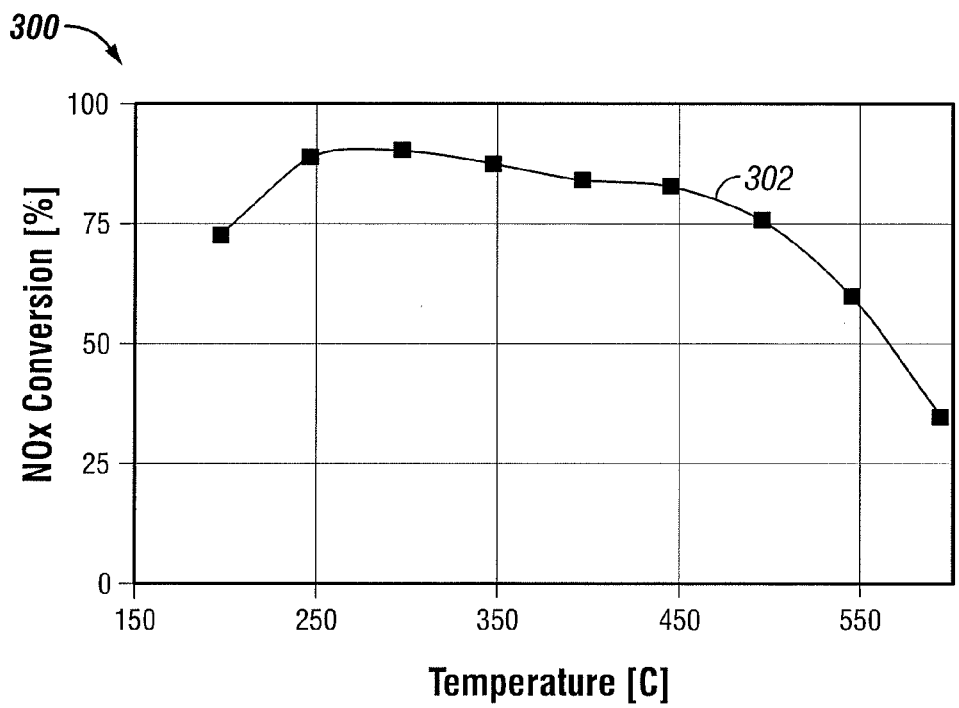
FIG. 3 is an example $NO_x$ conversion versus temperature relationship.
Figure 4:
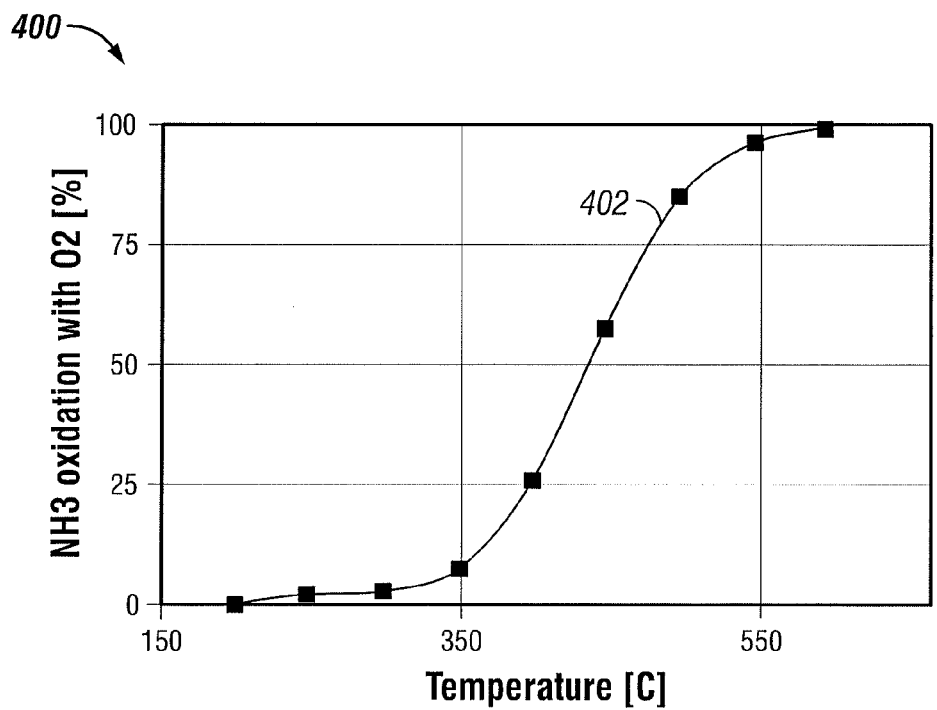
FIG. 4 is an example $NH_3$ oxidation versus temperature relationship.

Referencing FIG. 3, an example data set 300 for $NO_x$ conversion of an SCR component as a function of temperature is illustrated. The curve 302 represents illustrative data that can be utilized to determine the $NO_x$ conversion efficiency of an SCR component according to the temperature of the SCR component. Data such as that illustrated in FIG. 3 is generally known and/or readily determined for a specific catalyst and aftertreatment component. Referencing FIG. 4, an example data set 400 for $NH_3$ oxidation on an SCR component as a function of temperature is illustrated. The curve 402 represents illustrative data that can be utilized to determine the parasitic reducing agent oxidation conversion efficiency of an SCR component according to the temperature of the SCR component. Data such as that illustrated in FIG. 4 is generally known and/or readily determined for a specific catalyst and aftertreatment component.

In certain embodiments, the SCR execution module 206 never commands both of the upstream reductant delivery device and the downstream reductant delivery device to inject at the same time, if both injections are for the purpose of immediate $NO_x$ conversion on the respective SCR component. In certain embodiments, the SCR execution module 206 commands both of the upstream reductant delivery device and the downstream reductant delivery device to inject during at least one operating condition selected from: injection overlap during an SCR active component 210 switch (e.g. from the upstream SCR component 104 to the downstream SCR component 106), pre-loading one of the upstream SCR component 104 and the downstream SCR component 106 when the component to be pre-loaded is not the active SCR component 210, and/or the SCR execution module 206 is performing a diagnostic operation.

As is evident from the figures and text presented above, a variety of aspects and embodiments thereof according to the present disclosure are contemplated.

According to one aspect, a system includes an internal combustion engine capable of producing an exhaust stream and an aftertreatment system operationally coupled to the exhaust stream. The aftertreatment system includes an upstream SCR component and a downstream SCR component. The upstream SCR component is positioned in a substantially different thermal environment than the downstream SCR component during operation of the internal combustion engine. An upstream reductant delivery device is positioned upstream of the upstream SCR component and a downstream reductant delivery device positioned between the upstream and downstream SCR components. The upstream SCR component and the downstream SCR component are sized to fully treat the entire exhaust stream at a low temperature highest NOx conversion condition with reductant provided only from the upstream reductant delivery device, and the downstream SCR component is sized to fully treat the entire exhaust stream at a high temperature highest NOx conversion condition.

According to one embodiment of the system, the downstream SCR component is sized to fully treat the entire exhaust stream at highest NOx conversion condition corresponding to normal operating temperatures. In another embodiment, the upstream SCR component comprises a washcoat on a particulate filter. In one refinement of this embodiment, the upstream SCR component is close coupled to the engine. In a further refinement of this embodiment, the system includes an oxidation catalyst positioned between the engine and the upstream SCR component. In another embodiment of the system, the upstream SCR component includes one of a Cu-zeolite and an Fe-zeolite.

According to another aspect, a controller is provided that is operable with a system including the internal combustion engine. The controller includes an operating regime module structured to interpret a current system operating condition, an SCR selection module structured to determine an active SCR component in response to the current system operating condition, and an SCR execution module structured to provide at least one of an upstream reductant delivery device command and a downstream reductant delivery device command in response to the active SCR component.

In one embodiment of the controller, the current system operating condition includes at least one condition selected from the conditions consisting of: a temperature of the upstream SCR component, a temperature of the downstream SCR component, a time since an engine start, an accumulated operating parameter since an engine start, a time since a change in the active SCR component, an accumulated operating parameter since a change in the active SCR component, and an engine loading parameter.

In another embodiment of the controller, the SCR selection module is further structured to determine the upstream SCR component is the active SCR component in response to an engine cold start operation. In another embodiment of the controller, the SCR selection module is further structured to determine the downstream SCR component is the active SCR component in response to one or more of the operating conditions selected from: an aftertreatment component regeneration event or an impending regeneration event, a particulate filter regeneration event or impending regeneration event, and a high engine load or impending high engine load.

In yet another embodiment of the controller, the SCR selection module is further structured to determine the downstream SCR component is the active SCR component in response to one or more of the operating conditions selected from: an aftertreatment component regeneration event or an impending regeneration event, a particulate filter regeneration event or impending regeneration event, and a high engine load or impending high engine load. In another embodiment of the controller, the SCR selection module determines the downstream SCR component is the active SCR component in response to an inlet temperature of the upstream SCR component exceeding a switching temperature. In a further refinement of this embodiment, the switching temperature comprises 400° C. The SCR selection module can further be structured to apply a temperature hysteresis to the switching temperature.

In another embodiment of the controller, the operating regime module is further structured to interpret an upstream reductant oxidation conversion, and the SCR selection module is further structured to determine the downstream SCR component is the active component in response to the upstream reductant oxidation conversion exceeding a conversion threshold. In one refinement of this embodiment, the conversion threshold comprises a value selected from the values consisting of: 5%, 10%, 25%, 30%, and 50%. The SCR selection module can further be structured to apply a hysteresis to the upstream reductant oxidation conversion and conversion threshold.

In another embodiment of the controller, the SCR execution module of the controller is structured so that the upstream reductant delivery device and the downstream reductant delivery device are never commanded to inject reductant at the same time if both injections are for the purpose of immediate NOx conversion on the respective SCR component. In another embodiment of the controller, the SCR execution module of the controller is structured to command both of the upstream reductant delivery device and the downstream reductant delivery device to inject reductant during at least one operating condition selected from the operating conditions consisting of: injection overlap during an SCR active component switch, pre-loading one of the upstream SCR component and the downstream SCR component when the one of the upstream SCR component and the downstream SCR component is not the active SCR component, and performing a diagnostic operation.

According to another aspect, a method comprises: operating an internal combustion engine to produce an exhaust stream; delivering the exhaust stream to an aftertreatment system comprising an upstream SCR component and a downstream SCR component, wherein the upstream SCR component is positioned in a substantially different thermal environment than the downstream SCR component; fully treating the entire exhaust stream with the upstream SCR component and the downstream SCR component at a low temperature highest NOx conversion condition; and fully treating the entire exhaust stream with the downstream SCR component at a high temperature highest NOx conversion condition.

In one embodiment, the highest NOx conversion condition corresponds to normal operating temperatures. In another embodiment, the method includes interpreting a current system operating condition; determining an active SCR component in response to the current system operating condition; and in response to determining the active SCR component, providing one of an upstream reductant delivery device command to an upstream reductant delivery device positioned upstream of the upstream SCR component for injection of a reductant and a downstream reductant delivery device command to a downstream reductant delivery device located between the upstream and downstream SCR components for injection of a reductant. In one refinement of this embodiment, the method includes determining the upstream SCR component is the active SCR component in response to the interpreting the current system operating condition as an engine cold start operation. In another refinement of this embodiment, the method includes determining the downstream SCR component is the active SCR component in response to interpreting the current system operating condition as one or more of the operating conditions selected from: an aftertreatment component regeneration event or an impending regeneration event, a particulate filter regeneration event or impending regeneration event, and a high engine load or impending high engine load. In yet another refinement of this embodiment, the method includes determining the downstream SCR component is the active SCR component in response to interpreting the current system operating condition to include an inlet temperature of the upstream SCR component exceeding a switching temperature. In another refinement of this embodiment, the method includes interpreting an upstream reductant oxidation conversion when interpreting the system operating condition and determining the downstream SCR component is the active component in response to the upstream reductant oxidation conversion exceeding a conversion threshold.

In another embodiment, the method includes preventing a simultaneous injection of reductant with an upstream reductant delivery device located upstream of the upstream SCR component and with a downstream reductant delivery device located between the upstream and downstream SCR components. In yet another embodiment, the method includes preventing a simultaneous injection of reductant with an upstream reductant delivery device located upstream of the upstream SCR component and with a downstream reductant delivery device located between the upstream and downstream SCR components if both injections are for the purpose of immediate NOx conversion on the respective SCR component. In yet another embodiment, the method includes injecting reductant with each of an upstream reductant delivery device located upstream of the upstream SCR component and a downstream reductant delivery device located between the upstream and downstream SCR components during at least one operating condition selected from the operating conditions consisting of: injection overlap during an SCR active component switch, pre-loading one of the upstream SCR component and the downstream SCR component when the one of the upstream SCR component and the downstream SCR component is not the active SCR component, and a performing a diagnostic operation.

According to another aspect, a method includes interpreting a current system operating condition of an internal combustion engine producing an exhaust stream; determining an active SCR component in response to the current system operating condition, wherein the active SCR component is selected from one of an upstream SCR component and a downstream SCR component located in an aftertreatment system receiving the exhaust stream, wherein the upstream SCR component is positioned in a substantially different thermal environment than the downstream SCR component; and in response to determining the active SCR component, providing one of an upstream reductant delivery device command to an upstream reductant delivery device positioned upstream of the upstream SCR components and a downstream reductant delivery device command to a downstream reductant delivery device positioned between the upstream and downstream SCR components.

According to one embodiment of the method, the current system operating condition comprises at least one condition selected from the conditions consisting of: a temperature of the upstream SCR component, a temperature of the downstream SCR component, a time since an engine start, an accumulated operating parameter since an engine start, a time since a change in the active SCR component, an accumulated operating parameter since a change in the active SCR component, and an engine loading parameter. In another embodiment of the method, determining the active SCR component includes determining the upstream SCR component is the active SCR component when the current system operating condition is interpreted as an engine cold start operation. In yet another embodiment of the method, determining the active SCR component includes determining the downstream SCR component is the active SCR component when the current system operating condition is interpreted as one or more of the operating conditions selected from: an aftertreatment component regeneration event or an impending regeneration event, a particulate filter regeneration event or impending regeneration event, and a high engine load or impending high engine load.

In another embodiment, the method includes determining the active SCR component determining the downstream SCR component is the active SCR component in response when the current system operating condition interprets an inlet temperature of the upstream SCR component exceeding a switching temperature. In yet another embodiment of the method, interpreting the current system operating condition includes interpreting an upstream reductant oxidation conversion, and determining the active SCR component includes determining the downstream SCR component is the active component in response to the upstream reductant oxidation conversion exceeding a conversion threshold.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine capable of producing an exhaust stream;
   an aftertreatment system operationally coupled to the exhaust stream, the aftertreatment system comprising an upstream selective reduction catalyst (SCR) component and a downstream SCR component, wherein the upstream SCR component is positioned in a substantially different thermal environment than the downstream SCR component when the internal combustion engine is producing an exhaust stream;
   an upstream reductant delivery device positioned upstream of the upstream SCR component and a downstream reductant delivery device positioned between the upstream and downstream SCR components; and
   wherein the upstream SCR component and the downstream SCR component are sized to fully treat the entire exhaust stream at a first highest NOx conversion condition corresponding to at least one of cold start and warm-up operating conditions of the system with reductant delivered only from the upstream reductant delivery device, and wherein the downstream SCR component is sized to fully treat the entire exhaust stream at a second highest NOx conversion condition corresponding to operating conditions of the system during at least one of an aftertreatment component regeneration event and a particulate filter regeneration event with reductant delivered only from the downstream reductant injector and with reductant delivery from the upstream reductant delivery device prevented during the at least one of the aftertreatment component regeneration event and the particulate filter regeneration event.

2. The system of claim 1, wherein the downstream SCR component is sized to fully treat the entire exhaust stream at a third highest NOx conversion condition corresponding to normal operating temperatures.

3. The system of claim 1, further comprising an oxidation catalyst upstream of the upstream SCR component, wherein the upstream SCR component comprises a washcoat on a particulate filter, the upstream SCR component is close coupled to the engine, and the upstream reductant delivery device is located downstream of the oxidation catalyst.

4. The system of claim 1, wherein the upstream SCR component includes one of a Cu-zeolite and an Fe-zeolite.

5. The system of claim 1, further comprising a controller, the controller comprising:
   an operating regime module structured to interpret a current system operating condition;
   an SCR selection module structured to determine an active SCR component in response to the current system operating condition; and
   an SCR execution module structured to provide at least one of an upstream reductant delivery device command and a downstream reductant delivery device command in response to the active SCR component.

6. The system of claim 5, wherein the current system operating condition comprises at least one condition selected from the conditions consisting of: a temperature of the upstream SCR component, a temperature of the downstream SCR component, a time since an engine start, an accumulated operating parameter since an engine start, a time since a change in the active SCR component, an accumulated operating parameter since a change in the active SCR component, and an engine loading parameter.

7. The system of claim 5, wherein the SCR selection module is further structured to determine the upstream SCR component is the active SCR component in response to an engine cold start operation.

8. The system of claim 7, wherein the SCR selection module is further structured to determine the downstream SCR component is the active SCR component in response to a high engine load or impending high engine load operating condition.

9. The system of claim 5, wherein the SCR selection module determines the downstream SCR component is the active SCR component in response to an inlet temperature of the upstream SCR component exceeding a switching temperature.

10. The system of claim 9, wherein the switching temperature comprises 400° C.

11. The system of claim 9, wherein the SCR selection module is further structured to apply a temperature hysteresis to the switching temperature.

12. The system of claim 5, wherein the operating regime module is further structured to interpret an upstream reductant oxidation conversion, and wherein the SCR selection module is further structured to determine the downstream SCR component is the active SCR component in response to the upstream reductant oxidation conversion exceeding a conversion threshold, wherein the conversion threshold varies inversely to a NOx conversion efficiency of the downstream SCR component.

13. The system of claim 12, wherein the conversion threshold comprises a value selected from the values consisting of: 5%, 10%, 25%, 30%, and 50%.

14. The system of claim 12, wherein the SCR selection module is further structured to apply a hysteresis to the upstream reductant oxidation conversion and conversion threshold.

15. The system of claim 5, wherein the SCR execution module is structured so that the upstream reductant delivery device and the downstream reductant delivery device are never commanded to inject reductant at the same time if both injections are for the purpose of immediate NOx conversion on the respective SCR component.

16. The system of claim 5, wherein the SCR execution module is structured to command both of the upstream reductant delivery device and the downstream reductant delivery device to inject reductant during a diagnostic operation.

17. A method, comprising:
operating an internal combustion engine to produce an exhaust stream;
delivering the exhaust stream to an aftertreatment system comprising an upstream selective reduction catalyst (SCR) component and a downstream SCR component, wherein the upstream SCR component is positioned in a substantially different thermal environment than the downstream SCR component;
fully treating the entire exhaust stream with the upstream SCR component and the downstream SCR component at a first highest NOx conversion condition corresponding to a warm-up operating condition of the internal combustion engine; and
fully treating the entire exhaust stream with the downstream SCR component at a second highest NOx conversion condition corresponding to operating conditions during at least one of an aftertreatment component regeneration event and a particulate filter regeneration event with reductant delivered only from a downstream reductant delivery device positioned between the upstream and downstream SCR components while preventing a simultaneous reductant delivery from an upstream reductant delivery device upstream of the upstream SCR component.

18. The method of claim 17, wherein a third highest NOx conversion condition corresponds to normal operating temperatures.

19. The method of claim 17, further comprising:
interpreting a current system operating condition;
determining an active SCR component in response to the current system operating condition; and
in response to determining the active SCR component, providing one of an upstream reductant delivery device command to the upstream reductant delivery device positioned upstream of the upstream SCR component for injection of a reductant and a downstream reductant delivery device command to the downstream reductant delivery device located between the upstream and downstream SCR components for injection of a reductant.

20. The method of claim 19, further comprising determining the upstream SCR component is the active SCR component in response to the current system operating condition being an engine cold start operation.

21. The method of claim 19, further comprising determining the downstream SCR component is the active SCR component in response to a high engine load or impending high engine load operating condition.

22. The method of claim 19, further comprising determining the downstream SCR component is the active SCR component in response to interpreting the current system operating condition to include an inlet temperature of the upstream SCR component exceeding a switching temperature.

23. The method of claim 19, further comprising:
interpreting an upstream reductant oxidation conversion when interpreting the system operating condition; and
determining the downstream SCR component is the active SCR component in response to the upstream reductant oxidation conversion exceeding a conversion threshold, wherein the conversion threshold varies inversely to a NOx conversion efficiency of the downstream SCR component.

24. The method of claim 17, further comprising preventing the simultaneous injection of reductant with the upstream reductant delivery device located upstream of the upstream SCR component and with the downstream reductant delivery device located between the upstream and downstream SCR components if both injections are for the purpose of immediate NOx conversion on the respective SCR component.

25. The method of claim 17, further comprising injecting reductant with each of the upstream reductant delivery device located upstream of the upstream SCR component and the downstream reductant delivery device located between the upstream and downstream SCR components during a diagnostic operation.

26. A method, comprising:
interpreting a current system operating condition of an internal combustion engine producing an exhaust stream;
determining an active selective catalytic reduction (SCR) component in response to the current system operating condition, wherein the active SCR component is selected from one of an upstream SCR component and a downstream SCR component located in an aftertreatment system receiving the exhaust stream, wherein the upstream SCR component is positioned in a substantially different thermal environment than the downstream SCR component, wherein:
determining the active SCR component includes determining the upstream SCR component is the active SCR component when the current system operating condition is interpreted as an engine cold start operation;
determining the active SCR component includes determining the downstream SCR component is the active SCR component when the current system operating condition is interpreted as one or more of an aftertreatment component regeneration event and a particulate filter regeneration event; and
in response to determining the downstream SCR component is the active SCR component, providing a downstream reductant delivery device command to a downstream reductant delivery device positioned between the upstream and downstream SCR components while preventing a simultaneous reductant delivery from an upstream reductant delivery device that is upstream of the upstream SCR component.

27. The method of claim 26, wherein the current system operating condition comprises at least one condition selected from the conditions consisting of: a temperature of the upstream SCR component, a temperature of the downstream SCR component, a time since an engine start, an accumulated operating parameter since an engine start, a time since a change in the active SCR component, an accumulated operating parameter since a change in the active SCR component, and an engine loading parameter.

28. The method of claim 26, wherein determining the active SCR component includes determining the upstream SCR component is the active SCR component when the current system operating condition is interpreted as an engine warm up operation.

29. The method of claim 26, wherein determining the active SCR component further includes determining the downstream SCR component is the active SCR component when the current system operating condition is interpreted as a high engine load or impending high engine load.

30. The method of claim 26, wherein determining the active SCR component includes determining the downstream SCR component is the active SCR component when the current system operating condition interprets an inlet temperature of the upstream SCR component exceeding a switching temperature.

31. The method of claim 26, wherein interpreting the current system operating condition includes interpreting an upstream reductant oxidation conversion, and determining the active SCR component includes determining the downstream SCR component is the active SCR component in response to the upstream reductant oxidation conversion exceeding a conversion threshold, wherein the conversion threshold varies inversely to a NOx conversion efficiency of the downstream SCR component.

32. The method of claim 26, further comprising an oxidation catalyst upstream of the upstream SCR component, wherein the upstream SCR component comprises a washcoat on a particulate filter, the upstream SCR component is close coupled to the internal combustion engine, and the upstream reductant delivery device is located downstream of the oxidation catalyst.

33. The method of claim 17, further comprising an oxidation catalyst upstream of the upstream SCR component, wherein the upstream SCR component comprises a washcoat on a particulate filter, the upstream SCR component is close coupled to the internal combustion engine, and the upstream reductant delivery device is located downstream of the oxidation catalyst.

* * * * *